3,419,509
MERCURY COMPOUNDS AS CATALYSTS FOR THE POLYURETHANE REACTION

Joseph T. Willett, Trenton, Mich., assignor to Wyandotte Chemicals Corporation, Wyandotte, Mich., a corporation of Michigan
No Drawing. Filed Nov. 22, 1965, Ser. No. 509,195
3 Claims. (Cl. 260—18)

ABSTRACT OF THE DISCLOSURE

When employed as catalysts for the polyurethane reaction, certain mercury compounds such as bis(phenyl mercury) dodecenyl succinate and bis(t-butyl mercury) dodecenyl succinate have been found to initially retard the reaction and thereafter, when the reaction commences, to provide a fully-cured product in a short period of time.

---

This invention relates to a process for the preparation of polyurethane reaction products. More particularly, this invention relates to the use of certain mercury compounds as catalysts in the preparation of polyurethane reaction products.

The known catalysts for the polyurethane reaction generally promote rapid reaction times and, in most instances, this is desirable. However, there are those situations where rapid reaction time is not desirable. In those instances, a catalyst is preferred which will initially delay the reaction and yet, when the reaction commences, provide a substantially fully-cured product in a short period of time. Examples of such situations are those applications of polyurethane reaction products wherein the reaction mixture must flow through relatively narrow passages prior to their use and in the preparation of high-rise foam panels.

It has now been found, in accordance with this invention, that a certain group of mercury compounds, when employed as catalysts for the polyurethane reaction, initially retards the reaction and thereafter, when the reaction commences, provides a fully-cured reaction product in a short period of time. The mercury compounds which are employed in accordance with this invention may be represented by the formula:

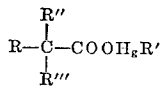

wherein:

R is hydrogen, alkyl, or —$(CH_2)_n$—$COOH_gR'$,
$n$ is from 0 to 3,
R' is an aryl, alkyl, alkaryl, aralkyl or alicyclic radical,
R'' is hydrogen or alkyl, and
R''' is a hydrocarbyl radical having at least five, preferably from five to twenty, carbon atoms.

The mercury compounds which are employed in accordance with this invention may be prepared by the reaction of a substituted mercury salt with a mono- or dicarboxylic acid or anhydride. A process of preparing these mercury compounds is disclosed in U.S. Patent 2,692,204.

Mono- and dicarboxylic acids and anhydrides which may be employed in the preparation of the mercury compounds used in accordance with this invention include saturated and unsaturated aliphatic monocarboxylic acids and anhydrides such as heptanoic, octanoic, 2-methyl hexanoic, 2,2-dimethyl hexanoic, nonanoic, decanoic, dodecanoic, octodecanoic, decenoic, dodecenoic and octodecanoic acids and anhydrides; and substituted saturated and unsaturated aliphatic dicarboxylic acids and anhydrides such as dodecenyl succinic, octenyl succinic, decenyl glutaric, octyl adipic and octodecyl malonic acids and anhydrides.

Substituted mercury salts which may be employed in the preparation of the mercury compounds used in accordance with this invention include phenyl mercury hydroxide, tolyl mercury hydroxide, benzyl mercury hydroxide, chlorophenyl mercury hydroxide, naphthyl mercury hydroxide, ethyl mercury hydroxide, t-butyl mercury hydroxide and cyclohexyl mercury hydroxide.

Some of the mercury compounds which may be employed in the present invention include t-butyl mercury decanoate, phenyl mercury 2,2-dimethyl hexanoate, phenyl mercury decenoate, phenyl mercury dodecanoate, chlorophenyl mercury dodecanoate, tolyl mercury dodecanoate, tolyl mercury octanoate, bis(phenyl mercury) dodecenyl succinate, bis(phenyl mercury) decenyl succinate, bis(tolyl mercury) dodecenyl succinate, bis(chlorophenyl mercury) octyl adipate and bis(t-butyl mercury) dodecenyl succinate.

The amount of catalyst employed in the process of this invention will vary considerably, depending upon the reactants and the desired rate of reaction. Generally, about 0.25 part to 5 parts by weight of catalyst based on the organic polyol will be employed.

It is to be understood that the mercury catalysts of this invention may be employed in the preparation of numerous polyurethane reaction products. Thus, polyurethane foams, elastomers, coatings and sealants may all be prepared according to this invention. The catalysts of this invention are particularly suited for use in the preparation of clay pipe and architectural sealants since these uses require a reaction mixture which has a gradual viscosity build-up, a rapid cure and a relatively short pot life, all features which are provided by use of the catalysts of this invention.

The polyurethanes prepared by the process of this invention basically comprise the reaction products of an isocyanate-containing material and an organic polyol. If it is desired to prepare a polyurethane foam, then, in addition to the above-mentioned materials, a blowing agent such as a halogen-substituted hydrocarbon and/or water is employed, as is generally a stabilizer such as an organic silicone compound. If it is desired to prepare a polyurethane sealant, then, in addition to the above-mentioned materials, a filler such as clay, calcium carbonate or silica is employed. It is to be understood that the particular reactants employed in the preparation of the polyurethane reaction products are well known in the art and vary according to the product desired.

Illustrative of the isocyanate-containing materials, which may be employed in accordance with this invention are organic polyisocyanates including aromatic, aliphatic and cyclo-aliphatic polyisocyanates and combinations thereof. Representative of these types are the diisocyanates such as m-phenylene diisocyanate, toluene-2,4-diisocyanate, hexamethylene-1,6-diisocyanate, tetramethylene-1,4-diisocyanate, cyclohexane-1,4-diisocyanate, naphthylene - 1,5 - diisocyanate, 1 - methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4''-triphenyl methane diisocyanate, polymethylene polyphenyliscoyanate, and toluene 2,4,6-triisocyanate and the tetraisocyanates such as 4,4'-dimethyldiphenyl methane 2,2',5,5'-tetraisocyanate. Especially useful due to their availability and properties are toluene diisocyanate, diphenylmethane-4,4'-diisocyanate and polymethylene polyphenylisocyanate.

Illustrative of the organic polyols which may be employed in accordance with this invention are those polyols containing at least two active hydrogen atoms. The term "active hydrogen atoms" refers to hydrogen atoms which, because of their position in the molecule, display activity according to the Zerewitinoff test as described by Kohler in J. of Am. Chem. Soc., 49, 3181 (1927).

The active hydrogen atoms are usually attached to oxygen, nitrogen or sulphur atoms. Thus, suitable active hydrogen-containing groups as determined by the Zerewitinoff method which are reactive with an isocyanate group include —OH, —NH—, —COOH and —SH. Examples of suitable types of organic compounds containing at least two active hydrogen-containing groups which are reactive with an isocyanate group are hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-containing polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethyl-glutaric acid, $\alpha$-$\beta$-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, $\alpha$-methyl glucoside, pentaerythritol and sorbitol.

Any suitable polyalkylene polyether polyols may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide and amylene oxide. The polyalkylene polyether polyols may be prepared from other starting materials such as tetrahydrofuran, epihalohydrins such as epichlorohydrin, as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Patent No 1,922,459. Polyethers which have found wide acceptance due to their excellent properties are the alkylene oxide addition products of trimethylolpropane, pentaerythritol, propylene glycol and sorbitol.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Alkylene oxide adducts of acids of phosphorus which may be used include those adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol such as those disclosed above for use in the preparation of the hydroxyl-containing polyesters.

Any suitable aliphatic thiol including alkane thiols containing at least two —SH groups may be used such as 1,2-ethane dithiol, 1,2-propane dithiol, 1,3-propane dithiol and 1,6-hexane dithiol; alkene thiols such as 2-butene-1,4-dithiol; and alkyne thiols such as 3-hexyne-1,6-dithiol.

Any suitable polyamine may be used including aromatic polyamines such as p-amino aniline, 1,5-secondary diamino naphthalene and 2,4-secondary diamino toluylene; aliphatic polyamines such as N,N'-secondary ethylene diamine, N,N'-secondary 1,3-propylene diamine, N,N'-secondary 1,4-butylene diamine and N,N'-secondary 1,3-butylene diamine.

Other compounds which do not necessarily fit within any of the previously set forth classes of compounds which are quite suitable in the production of NCO-terminated polyurethane compounds include the hydroxy-terminated polyurethane polymers such as a hydroxy-terminated polymer made by reacting an isocyanate with several moles of an alkylene glycol.

If desired, other catalysts may be employed in addition to the mercury catalysts of this invention. Any of the standard polyurethane catalysts such as amines and metal salts may be employed. Examples of such catalysts include N-methylmorphone, triethylamine, triethylene diamine, tetramethylene ethylene diamine, lead naphthenate, dibutyltin dilaurate, sodium stearate and zinc octoate.

The polyurethane reaction products may be prepared either by the prepolymer method, the "quasi" method, or by the "one-shot" method. These methods are well known in the art. The reaction conditions vary with the reactants employed and with the method followed. None of the conditions are important insofar as applicant's invention is concerned since applicant's invention resides in the finding that a certain group of mercury compounds imparts unique properties to polyurethane reaction products, however prepared.

The following examples illustrate the invention. All parts are by weight unless otherwise stated.

EXAMPLE I

A polyurethane sealant was prepared in the following manner:

(A) To a reaction vessel was charged 75 parts of a 3,000 molecular weight triol based on glycerine and propylene oxide and 132.8 parts of tolylene diisocyanate. The mixture was heated for one hour at 50° C. Twenty-five parts of a 400 molecular weight polypropylene glycol was then added to the reaction mixture, and the mixture was stirred for an additional hour at 50° C. The free NCO-content of the reaction mixture was determined to be 24%.

(B) A mixture was prepared comprising 12.7 parts of a 4,000 molecular weight triol based on propylene oxide and trimethylolpropane, 33.1 parts of a 1,500 molecular weight triol based on propylene oxide and trimethylolpropane, 42.2 parts of clay and 1.2 parts of bis(phenyl mercury) dodecenyl succinate. To this mixture was added 11.8 parts of the reaction mixture prepared in (A) and the combined product was employed as a sealant for a clay pipe.

The sealant prepared in this example had a pot life of 5.9 minutes, reached a Shore A Hardness of 52 in 40 minutes and developed a viscosity build-up as follows:

| Time, sec.: | Viscosity, cps. |
|---|---|
| 60 | 3,400 |
| 90 | 3,900 |
| 120 | 4,200 |
| 150 | 4,700 |
| 180 | 5,900 |
| 210 | 7,500 |
| 240 | 11,400 |

EXAMPLE II

The procedure of Example I is followed with the exception that 1.2 parts of bis(t-butyl mercury) dodecenyl succinate is employed in lieu of bis(phenyl mercury) dodecenyl succinate. A polyurethane reaction product is prepared which demonstrates efficacy as a clay pipe sealant since the reaction product is fully cured (reaches a Shore A Hardness of at least 40 in 40 minutes), has a short pot life (from 4 to 7 minutes) and demonstrates a gradual viscosity build-up.

EXAMPLE III

In this example, a number of compounds were evaluated as catalysts in the preparation of polyurethane sealants. The general procedure of Example I was followed. The results of this evaluation appear in Table 1.

TABLE 1

| | Catalysts | | | |
|---|---|---|---|---|
| | Bis(phenyl-mercury) dodecenyl succinate | (Bis(tribuyl-tin) dodecenyl succinate | Mercury acetate | Bis(t-butyl-mercury) dodecenyl succinate |
| Pot life, minutes | 5.9 | >90 | >60 | 6 |
| Shore A Hardness at 40 minutes° | 52 | 4 | No cure | >40 |
| Viscosity, cps.: | | | | |
| 60 sec | 3,400 | 3,000 | 4,800 | ~3,000 |
| 90 sec | 3,900 | 3,100 | 5,200 | (*) |
| 120 sec | 4,200 | 3,100 | 5,000 | (*) |
| 150 sec | 4,700 | 3,100 | 4,900 | 4,500 |
| 180 sec | 5,900 | 3,100 | 4,700 | (*) |
| 210 sec | 7,500 | 3,100 | 4,500 | (*) |
| 240 sec | 11,400 | 3,100 | 4,500 | ~11,000 |

*Not recorded at this time.

From this example, it is clear that the particular mercury compounds of this invention impart unexpected improvements to polyurethane reaction products. Not all mercury compounds are as effective as those of this invention as is evidenced by the failure of mercury acetate to give comparable results. This example further demonstrates that the substitution of tin for mercury also fails to give comparable results.

EXAMPLE IV

A polyurethane foam was prepared in the following manner. Fifty parts of a 425 molecular weight polyol based on propylene oxide and α-methyl glucoside and 50 parts of a six-mole propylene oxide adduct of phosphoric acid was charged to a reactor along with 1.5 parts of a silicone stabilizer, 0.3 part of tetramethylene ethylene diamine, 1.2 parts of bis(phenyl mercury) dodecenyl succinate and 47.0 parts of a fluorinated hydrocarbon. While stirring the above reactants, 144 parts of polyarylene polyisocyanates (commonly known as PAPI) was added thereto. The cream time was 70 seconds and the tack free time was about 20 minutes. The cream time is a measure of the rate of reaction since it is the time when the reactants begin to foam. The tack free time is a measure of the cure of the product.

To demonstrate the value of the bis(phenyl mercury) dodecenyl succinate catalyst in the preparation of the above foam, another foam was prepared exactly as above with the single exception that bis(phenyl mercury) dodecenyl succinate was not employed. The cream time was 55 seconds and the tack free time was about 35 minutes.

This example demonstrates that the use of bis(phenyl mercury) dodecenyl succinate as catalyst in the preparation of a polyurethane foam resulted in a product having a substantially full cure in a relatively short period of time even though the reaction was initially retarded.

EXAMPLE V

The previous example was duplicated using 0.6 part of bis(phenyl mercury) dodecenyl succinate. The cream time was 65 seconds and the tack free time was about 25 minutes. Again, bis(phenyl mercury) dodecenyl succinate proved highly effective in retarding the reaction and in promoting a substantially full cure in a short period of time.

EXAMPLE VI

A polyurethane foam is prepared following the procedure of Example IV with the exception that 1.2 parts of t-butyl mercury decanoate was employed in lieu of bis(phenyl mercury) dodecenyl succinate. Results comparable to those of Example IV are obtained.

What is claimed is:
1. In a process for the preparation of polyurethane reaction products comprising the reaction of an organic polyisocyanate-containing material and an organic polyol, the improvement which comprises carrying out the reaction in the presence of a mercury compound selected from the group consisting of:
   (1) chlorophenyl mercury dodecanoate,
   (2) bis-(phenyl mercury)-dodecenyl succinate,
   (3) bis-(phenyl mercury)-decenyl succinate,
   (4) bis-(tolyl mercury)-dodecenyl succinate,
   (5) bis-(chlorophenyl mercury)-octyl adipate, and
   (6) bis-(t-butyl mercury)-dodecenyl succinate.
2. The process of claim 1 wherein said mercury compound is bis-(phenyl mercury)-dodecenyl succinate.
3. The process of claim 1 wherein said mercury compound is bis-(t-butyl mercury)-dodecenyl succinate.

References Cited

UNITED STATES PATENTS

| 2,692,204 | 10/1954 | Nowak | 106—15 |
| 3,136,732 | 6/1964 | Kaestner et al. | 260—33.6 |
| 3,201,136 | 8/1965 | Harrison et al. | 277—198 |
| 3,231,597 | 1/1966 | Fischer | 260—455 |
| 3,291,660 | 12/1966 | Oberth et al. | 149—19 |

FOREIGN PATENTS

| 720,528 | 10/1965 | Canada. |
| 909,358 | 10/1962 | Great Britain. |
| 970,497 | 9/1964 | Great Britain. |
| 997,369 | 7/1965 | Great Britain. |

OTHER REFERENCES (1) Britain et al., Journal of Applied Polymer Science, vol. IV, No. 11, pp. 207–211 (1960).

DONALD E. CZAJA, *Primary Examiner.*

F. McKELVEY, *Assistant Examiner.*

U.S. Cl. X.R.

260—77.5, 75, 2.5, 431, 414